United States Patent
Okamoto

[11] 3,768,451
[45] Oct. 30, 1973

[54] IGNITION TIMING CONTROL SYSTEM
[75] Inventor: Hisaji Okamoto, Obu, Japan
[73] Assignee: Nippondenso Co., Ltd., Kariya-shi, Japan
[22] Filed: June 3, 1971
[21] Appl. No.: 149,472

[30] Foreign Application Priority Data
June 6, 1970  Japan.................. 45/49052

[52] U.S. Cl............................ 123/117 A, 123/148 E
[51] Int. Cl.............................................. F02p 5/08
[58] Field of Search ................. 123/148 E, 117 R, 123/117 A; 315/209

[56] References Cited
UNITED STATES PATENTS

| | | | |
|---|---|---|---|
| 3,418,989 | 12/1968 | Silverman | 123/148 E |
| 3,521,611 | 7/1970 | Finch | 123/146.5 A |
| 3,554,177 | 1/1971 | Hufton | 123/148 E |
| 3,464,397 | 9/1969 | Burson | 123/148 E |
| 3,314,407 | 4/1967 | Schneider | 123/148 E |

Primary Examiner—Laurence M. Goodridge
Attorney—Cushman, Darby & Cushman

[57] ABSTRACT

An ignition timing control system having a set of ignition times preset to meet the ignition timing requirements of an engine operating under various satisfactory operating conditions, whereby an ignition time which meets the ignition timing requirement of the engine at each time is selected from the said set of ignition times to be applied to the engine according to the engine revolutions, engine intake manifold vacuum, temperature of the engine cooling water and so on.

2 Claims, 11 Drawing Figures

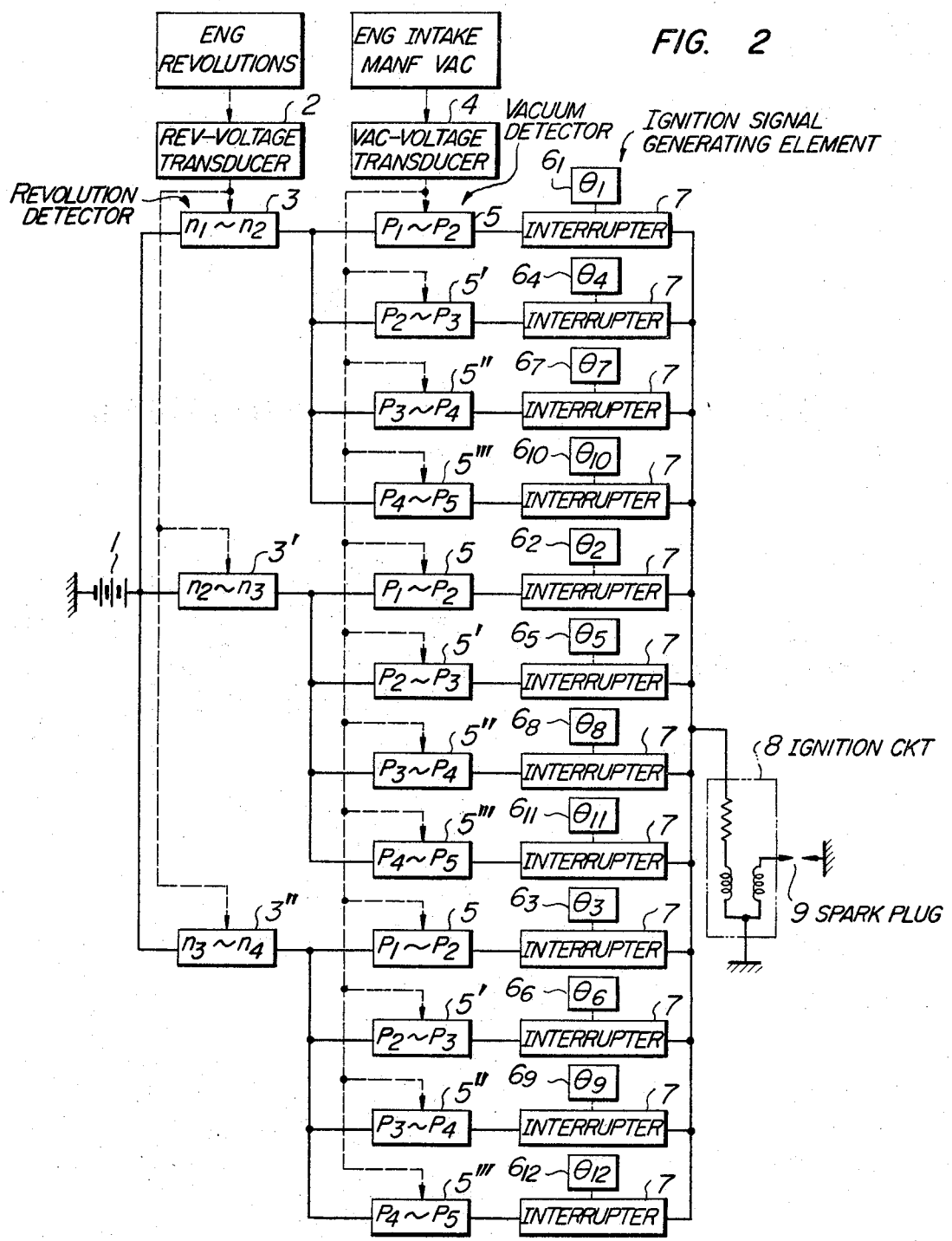

IGNITION TIMING CONTROL SYSTEM

BACKGROUND OF THE INVENTION

1. Field of the Invention

The present invention relates particularly to a control system for controlling the ignition timing of a spark-ignition internal combustion engine.

2. Description of the Prior Art

The conventional ignition timing control systems of the kind comprise a centrifugal spark advance mechanism for adjusting the ignition timing of an engine according to the number of revolutions of the engine and a vacuum control mechanism adapted to advance or retard the ignition timing according to the engine intake manifold vacuum. This is based on the concept that primarily the ignition of an engine can be accurately timed to a satisfactory degree according to two factors; the engine revolutions and engine intake manifold vacuum.

With the conventional ignition timing control systems described above, a spark advance characteristic curve corresponding to the engine rpm is obtained by means of the centrifugal spark advance mechanism and then a parallel displacement of this spark advance characteristic curve is effected by the vacuum control mechanism according to the engine intake manifold vacuum so as to obtain a desired ignition timing.

However, in the operation of a practical engine, the ignition timing required for the engine is not necessarily determined in accordance with the above-mentioned parameters and the required ignition timing will vary in a more complicated manner according to the engine rpm and the engine intake manifold vacuum. In other words, it is usual that while the ignition timing must be varied in some measure according to the engine revolutions under a full engine load condition (when the engine intake manifold vacuum is at its minimum), at a reduced engine load (when the engine intake manifold vacuum is increased) it is not necessary to vary the ignition timing in the same measure according to the engine revolutions.

With the conventional systems, therefore, in some operating conditions the engine is operated with an improper ignition timing, which does not meet the required ignition timing of the engine, thus giving rise to problems from the standpoint of improving engine performance and the control of harmful exhaust gas emissions.

Furthermore, along with the recent rapid progress in the industrial world, it has been discovered that the correct ignition timing of an engine will vary considerably depending not only on the aforesaid two factors, but also on other factors such as the engine temperature (cooling water temperature), vehicle speed and a position of a gear-changing lever. Since the correct ignition timing of the engine varies considerably according to these various factors, none of the ignition timing controls based on the conventional conception can accurately meet the ignition timing requirements of the engine.

SUMMARY OF THE INVENTION

The main object of the present invention is therefore to provide a novel and very useful ignition timing control system which solves the above-mentioned problems of the prior art altogether.

The system of the present invention is based on the principle that a set of ignition times that meet the ignition timing requirements of an engine operating under various satisfactory operating conditions are preset so that a proper ignition time that meets the ignition timing requirement of the engine at each time can be selected for the engine from the said set of ignition times according to the engine revolutions, engine intake manifold vacuum, temperature of the engine cooling water and so on.

According to the present invention, the accurate ignition timing (corresponding to the ignition timing requirement of an engine) is always provided for the engine under various operating conditions of the engine, thereby offering a posibility of greatly improved engine performance and emission control of harmful exhaust gases.

BRIEF DESCRIPTION OF THE DRAWING

FIG. 2 is a block diagram illustrating an embodiment of the present invention.

DESCRIPTION OF THE PREFERRED EMBODIMENT

Figure 1:
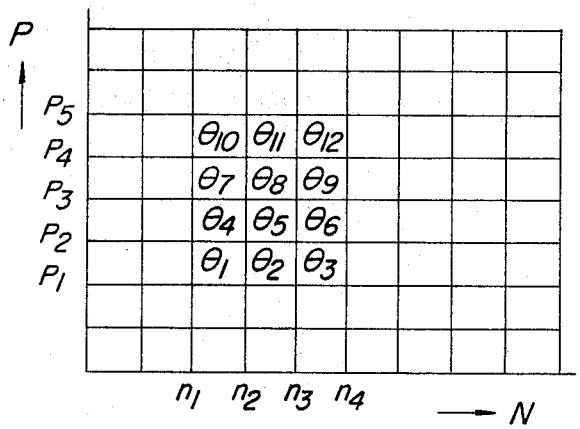
FIG. 1 is a diagram for explaining the fundamental concept of the present invention.

The present invention will now be explained in detail with reference to the accompanying drawings. FIG. 1 is a diagram for explaining the fundamental concept of the present invention when the ignition timing is controlled according to the engine revolutions $N$ and the engine intake manifold vacuum $P$. A correct ignition time $\theta$ of an engine, when the engine revolutions are within a specific range between $n_2$ and $n_3$, for example, and the engine intake manifold vacuum is also within a specific range between $p_3$ and $p_4$, for example, is obtained and it is set as $\theta_8$, for example. Similarly, other correct ignition times at various other engine revolution ranges and engine intake manifold vacuum ranges are set to draw coordinates as shown in FIG. 1. Thus, when an engine revolution $N$ and an intake manifold vacuum $P$ meet the requirements, one of the corresponding set ignition times is selected and applied to the engine in the form of an ignition signal.

One embodiment of the system of the present invention which is based on the described fundamental concept will now be explained with reference to FIG. 2.

Figure 3:
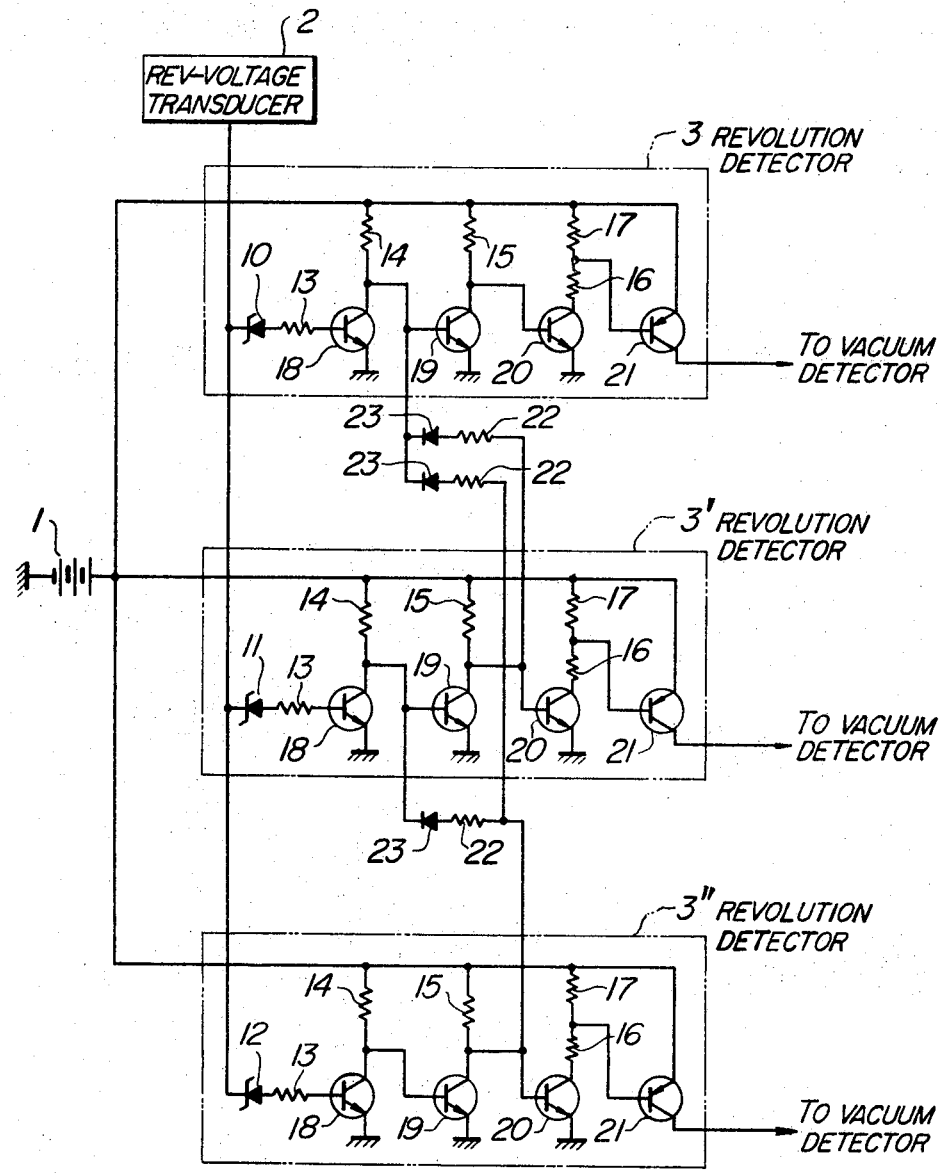
FIG. 3 is a practical electrical circuit diagram of the set of the engine revolution detectors shown in FIG. 2.

In FIG. 2, numeral 1 designates a DC power source, such as a battery; 2 a revolutions-per-minute voltage transducer for converting the engine revolutions N into a voltage; 3, 3' and 3'' revolution detectors each thereof being adapted to detect the output of the revolution-voltage transducer so as to close its associated circuit while the engine revolutions remain within the set revolutions range; for example, the revolution detector 3' for the revolutions range $n_2$ to $n_3$ closes the associated circuit when the revolutions are above $n_2$ but below $n_3$, and FIG. 3 illustrates by way of example a practical electric circuit of these revolution detectors (the construction and operation of this circuit will be explained later). Numeral 4 designates a vacuum-voltage transducer for converting the engine intake manifold vacuum P into a voltage; 5, 5', 5'', 5''' vacuum detectors each of which is adapted to detect the output voltage of the vacuum-voltage transducer to close its associated circuit while the vacuum remains within the set vacuum range; for example, the vacuum detector 5'' for the vacuum range $p_3$ to $p_4$ closes the associated circuit when the vacuum is higher than $p_3$ but lower than $p_4$ and the circuit construction of these vacuum detectors may be similar to that of the revolution detectors. Numerals $6_1, 6_2, 6_3, \ldots, 6_{12}$ designate ignition signal generating elements corresponding to the set ignition times and each of the elements separately produces an ignition signal at the corresponding set ignition time. Numeral 7 designates interrupters for opening and closing associated dircuits with the ignition signals produced by the ignition signal generating elements; 8 an ignition circuit; 9 a spark plug. The revolution detectors 3, 3' and 3'' and the vacuum detectors 5, 5', 5'' and 5''' are connected in series with the primary circuit of the ignition circuit 8 in geometric progression and the interrupters 7 are connected in series with the respective vacuum detectors constituting the final stage detectors, while each of the interrupters 7 is associated with the corresponding ignition signal generating element which satisfies the conditions of all the preceding detectors of the interrupter.

With the arrangement described above, when the engine revolutions N are larger than $n_1$ but smaller than $n_2$ only the revolution detector 3 is turned on and simultaneously only the vacuum detector 5 is turned on if the engine intake manifold vacuum P is higher than $p_1$ but lower than $p_2$. The respective ignition signal generating elements periodically produce ignition signals so that the interrupters 7 are turned on with the ignition signals from the ignition signal generating elements 6, thereby closing the circuits between the power source and the ignition circuit 8. The ignition signal generating element 6 produces a pulse-like output which vanishes for examle, at the ignition time $\theta_1$, so that at the ignition time $\theta_1$ the primary circuit of the ignition circuit 8 is opened and hence an ignition spark is delivered to the spark plug 9 by the transformer action of the ignition coils. In other words, the ignition time $\theta_1$ corresponds to a condition where the engine revolutions N are $n_1 \leq 24\ N < n_2$ and the engine intake manifold vacuum P is $p_1 \leq P < p_2$. The set ignition time pattern shown in FIG. 1 precisely represents the ignition timing requirements of the engine and an accurate ignition timing is thereby supplied to the engine to meet its operating conditions.

Next, the revolution detectors having a construction similar to that of the vacuum detectors will be explained with reference to the illustrated specific example. In FIG. 3, the respective revolution detectors comprise Zener diodes 10, 11 and 12 whose Zener voltages are the voltages corresponding to the set revolutions, and each of the revolution detectors further comprises resistors 13, 14, 15, 16 and 17 and four transistors 18, 19, 20 and 21. In the revolution detector 3, when the engine revolutions N exceed $n_1$, the Zener diode 10 is rendered conductive, the transistor 18 is turned on, the transistor 19 is turned off, the transistor 20 is turned on, and hence the transistor 21 is turned on, thereby turning on the revolution detector 3 with respect to the power source 1. In the revolution detector 3', the Zener diode 11 is rendered conductive when the engine revolutions N exceed $n_2$ and this turns on the revolution detector 3' with respect to the power source 1 in the similar manner as the detector 3. The revolution detector 3'' has its Zener diode 12 rendered conductive when the engine revolutions N exceed $n_3$ and it is thus turned on with respect to the power source 1 in a similar manner to the detectors 3 and 3'.

A series circuit comprising a resistor 22 and a diode 23 is provided between the detectors 3 and 3', between the detectors 3' and 3'' and between the detectors 3'' and 3, respectively. Thus, if the detector 3'' is turned on, for example, the collector voltage of the transistor 19 (in the off state) in the detector 3'' is applied to the base of the transistor 19 in each of the detectors 3 and 3' so that these transistors 19 are turned on to thereby turn the detectors 3 and 3' into the off state. In this way, only the revolution detector 3 is turned on when the engine revolutions N are $n_1 \leq N < n_2$, only the detector 3' is turned on when $n_2 \leq N < n_3$, and only the detector 3'' is turned on when $n_3 \leq N < n_4$.

In this connection, the vacuum detectors are similar in circuit construction with the revolution detectors. Thus, only the vacuum detector 5 is turned on when the ingine intake manifold vacuum P is $p_1 \leq P < p_2$, only the detector 5' is turned on when $p_2 \leq P < p_3$, only the detector 5'' is turned on when $p_3 \leq P < p_4$, and only the detector 5'' is turned on when $p_4 \leq P < p_5$.

Consequently, when the engine revolutions N are $n_1 \leq N < n_2$ and the engine intake manifold vacuum P is $p_1 \leq P < p_2$, for example, the ignition time $\theta_1$ is selected as the correct ignition time as previously explained.

Next, the construction and operation of the ignition signal generator including ignition signal generating elements and of the interrupters will be explained with reference to FIGS. 4 through 11.

Figure 4:
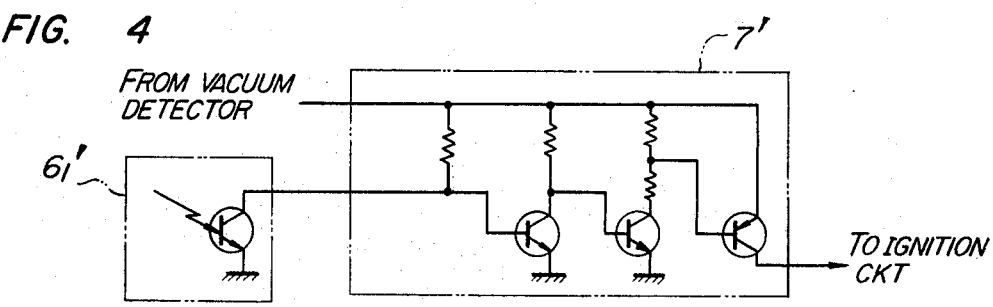
FIG. 4 is an electrical circuit diagram of an interrupter section wherein a photo transistor is employed as an ignition signal generating element by way of example.
Figure 5:
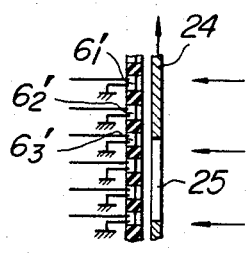
FIGS. 5 and 6 are diagrams for explaining the mechanism of an ignition signal generator employing photo transistors.
Figure 6:
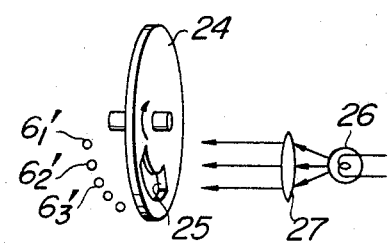

Referring first to FIGS. 4 through 6, the ignition signal generating elements used consist of photo transistors $6'_1, 6'_2, 6'_3, \ldots$ which are circumferentially arranged at center angles corresponding to the set ignition times $\theta_1, \theta_2, \theta_3, \ldots$. Disposed opposite to the gang of the photo transistors is a rotary disc 24 which rotates in synchronism with the rotational speed of the engine. The rotary disc 24 is provided with a transparent window 25 for controlling the conduction period of the respective photo transistors, so that the light from a light source 26 passes through a lens 27 and it is directed to the photo transistors by way of the transparent window 25. When one of the photo transistors receives the light, the photo transistor remains in its conduction state while it is receiving the light and hence the interrupter 7' comprising three transistors remains in the on state during the conduction period of the photo transistor.

Figure 7:
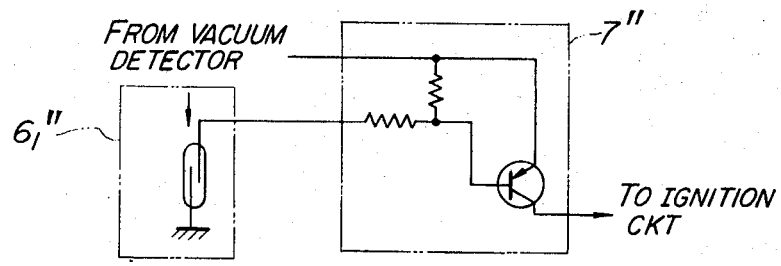
FIG. 7 is an electrical circuit diagram of another form of the interrupter section employing a reed switch as an ignition signal generating element.
Figure 8:
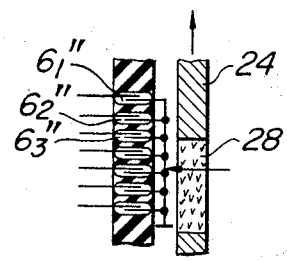
FIGS. 8 and 9 are diagrams for explaining the mechanism of another form of ignition signal generator employing reed switches.
Figure 9:
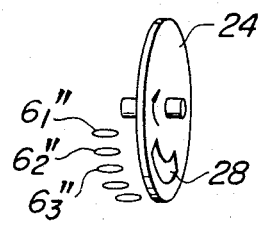

Referring to FIGS. 7 through 9, the ignition signal generating elements used consist of reed switches $6''_1$, $6''_2$, $6''_3$, ... which are circumferentially arranged at center angles corresponding to the set ignition times $\theta_1$, $\theta_2$, $\theta_3$, .... In like manner as previously described, a rotary disc 24 is disposed opposite to the gang of the reed switches and a permanent magnet 28 is fitted into the rotary disc 24 to control the conduction period of the respective reed switches. When one of the reed switches is closed by the action of the magnetic field of the permanent magnet 28, the corresponding interrupter 7'' comprising a single transistor remains in the on state during the time that the reed switch remains closed.

Figure 10:
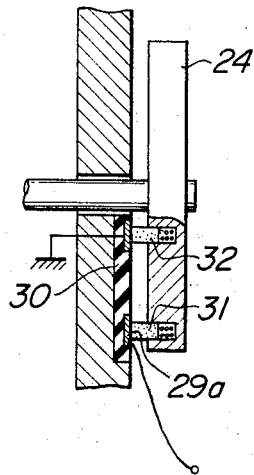
FIGS. 10 and 11 are diagrams for explaining the mechanism of a further form of ignition signal generator employing a commutator as an ignition signal generating element.
Figure 11:
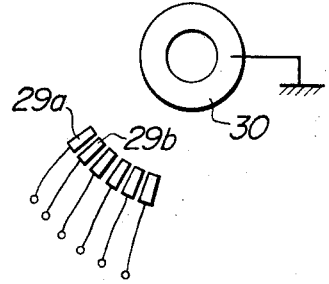

Referring now to FIGS. 10 and 11, the ignition signal generating elements used consist of a commutator comprising conducting bars $29_a$, $29_b$, ... and a ground ring 30 and the conducting bars are circumferentially arranged at center angles corresponding to the set ignition times $\theta_1$, $\theta_2$, .... In like manner as previously described, a rotary disc 24 is disposed opposite to the commutator. The rotary disc 24 is made of a conducting material and it comprises a first brush 31 for making sliding contact with the conducting bars $29_a$, $29_b$, ... and a second brush 32 for making sliding contact with the ground ring 30. In this case, the interrupters 7 may have a circuit construction, such as is shown in FIG. 7.

In the arrangements shown in FIGS. 4 through 11, the rotary disc 24 (having the transparent window 25, permanent magnet 28 or brushes 31 and 32) constitutes a driving element for causing the ignition signal generating elements to periodically produce ignition signals and it is self-evident that there may be made many modifications to the form of the driving element and to the relative relationships between the driving element and the ignition signal generating elements.

While in the embodiment detailed above the ignition timing is controlled according to the two factors comprising the engine revolutions and the engine intake manifold vacuum, other additional factors such as the temperature of cooling water and the position of a gear-changing lever may be employed to set the required ignition times, so that if detectors adapted to close the circuits when the values of these additional factors fall within a plurality of preset ranges are connected in geometric progression and in series with the vacuum detectors at the succeeding stage thereof in the arrangement of FIG. 2, the timing of the ignition may be controlled according to further more factors. Furthermore, if, particularly a large number of ignition signal generating elements in the ignition signal generator are arranged at very small angles (ignition times) so that any given signal generating elements are selected to provide the required circuitry, it may prove to be an effective measure for improving the versatility of the system according to the present invention.

I claim:
1. An ignition timing control system for use with an electric power source and an ignition circuit for internal combustion engine comprising:
    engine revolution detecting means connected to said electric power source and having a plurality of detectors each of which detects a different preset range of engine revolutions and generates an output signal only when the revolutions fall within the respective preset range;
    engine intake vacuum detecting means connected to each of the output terminals of said engine revolution detecting means and having a plurality of detectors each of which detects a preset range of engine intake vacuum and generates an output signal only when the vacuum falls within the respective preset range and said detector has an input signal from said engine revolution detecting means;
    ignition signal generator means having a plurality of generators each of which is for generating a respective ignition signal at a preselected timing periodically;
    interrupting means having a plurality of interrupters each of which is connected to a respective one of said generators and to a respective output of said engine intake vacuum detecting means and supplies electric power only when said interrupter has an output from said intake manifold vacuum detecting means and interrupts the electric power when said interrupter has said ignition signal as its input.

2. A system as in claim 1 wherein:
    said plurality of detectors in said intake vacuum detecting means includes $N$ groups of $P$ detectors, $P$ being greater than $N$;
    the said preset range of intake vacuum being different for each of said $P$ detectors in any of said $N$ groups thereof,
    said plurality of detectors in said revolution detecting means being $N$ in number and being connected respectively to said $N$ groups of $P$ detectors;
    there being $N$ times $P$ number of said generators for providing their said ignition signals at respectively different times.

* * * * *